US011285830B2

(12) United States Patent
Zaki

(10) Patent No.: US 11,285,830 B2
(45) Date of Patent: Mar. 29, 2022

(54) CHARGING CABLE

(71) Applicant: AUDI AG, Ingolstadt (DE)

(72) Inventor: Sami Robert Zaki, Regensburg (DE)

(73) Assignee: AUDI AG, Ingolstadt (DE)

( * ) Notice: Subject to any disclaimer, the term of this patent is extended or adjusted under 35 U.S.C. 154(b) by 69 days.

(21) Appl. No.: 16/733,668

(22) Filed: Jan. 3, 2020

(65) Prior Publication Data

US 2020/0238841 A1  Jul. 30, 2020

(30) Foreign Application Priority Data

Jan. 24, 2019 (DE) ...................... 10 2019 200 870.4

(51) Int. Cl.
H02J 7/00 (2006.01)
B60L 53/18 (2019.01)
B60L 53/60 (2019.01)
H01R 13/66 (2006.01)

(52) U.S. Cl.
CPC ............... B60L 53/18 (2019.02); B60L 53/60 (2019.02); H01R 13/6683 (2013.01); H02J 7/007182 (2020.01); H02J 7/007192 (2020.01); B60L 2210/30 (2013.01)

(58) Field of Classification Search
None
See application file for complete search history.

(56) References Cited

U.S. PATENT DOCUMENTS

| 2013/0175973 | A1* | 7/2013 | Jones | B60L 3/0046 320/105 |
| 2014/0179164 | A1* | 6/2014 | Kanamori | B60L 53/65 439/620.21 |
| 2018/0361862 | A1 | 12/2018 | Hein et al. | |
| 2019/0067973 | A1 | 2/2019 | Yamada | |

FOREIGN PATENT DOCUMENTS

| DE | 102010053074 A1 | 8/2011 |
| DE | 10 2011 107 628 A1 | 1/2013 |
| DE | 10 2011 084 527 A1 | 4/2013 |
| DE | 10 2013 007 330 A1 | 10/2014 |
| DE | 10 2015 207 400 A1 | 11/2015 |
| DE | 20 2016 103 030 U1 | 9/2017 |

(Continued)

OTHER PUBLICATIONS

European Search Report dated May 8, 2020, in corresponding European application No. 19215153.8 including Machine-generated English-language translation; 14 pages.

(Continued)

*Primary Examiner* — Arun C Williams
(74) *Attorney, Agent, or Firm* — Maier & Maier, PLLC

(57) ABSTRACT

A charging cable including a rectifier, a first connector element, and a second connector element. The first connector element is designed for connection to a vehicle-external energy source and the second connector element is designed for connection to a charging socket of a motor vehicle with an electrical traction energy accumulator. An alternating current supplied at the first connector element is convertible by the rectifier into a direct current deliverable at the second (Continued)

connector element. The first connector element is detachably fastened on the charging cable via an interface of the charging cable.

12 Claims, 2 Drawing Sheets

(56) References Cited

FOREIGN PATENT DOCUMENTS

| | | |
|---|---|---|
| DE | 10 2016 106 840 A1 | 10/2017 |
| DE | 20 2017 102 886 U1 | 8/2018 |
| DE | 112016006739 T5 | 1/2019 |
| EP | 3 266 646 A1 | 1/2018 |
| FR | 3013165 A1 | 5/2015 |
| JP | 2009194958 A | 8/2009 |

OTHER PUBLICATIONS

Examination Report dated Nov. 13, 2019 in corresponding German application No. 10 2019 200 870.4; 12 pages including Machine-generated English-language translation.
European Office Action dated Mar. 24, 2021, in connection with corresponding EP Application No. 19 215 153.8 (14 pp., including machine-generated English-language translation).
Anonymous., "Gallium Nitride", Wikipedia, XP055878394, Jan. 21, 2019; 11 pages.
Anonymous., "Silicon carbide", Wikipedia, XP055878397, Dec. 19, 2018; 16 pages.
European Examination Report dated Jan. 21, 2022, in connection with corresponding European Application No. 19 215 153.8 (18 pp., including machine-generated English translation).

\* cited by examiner

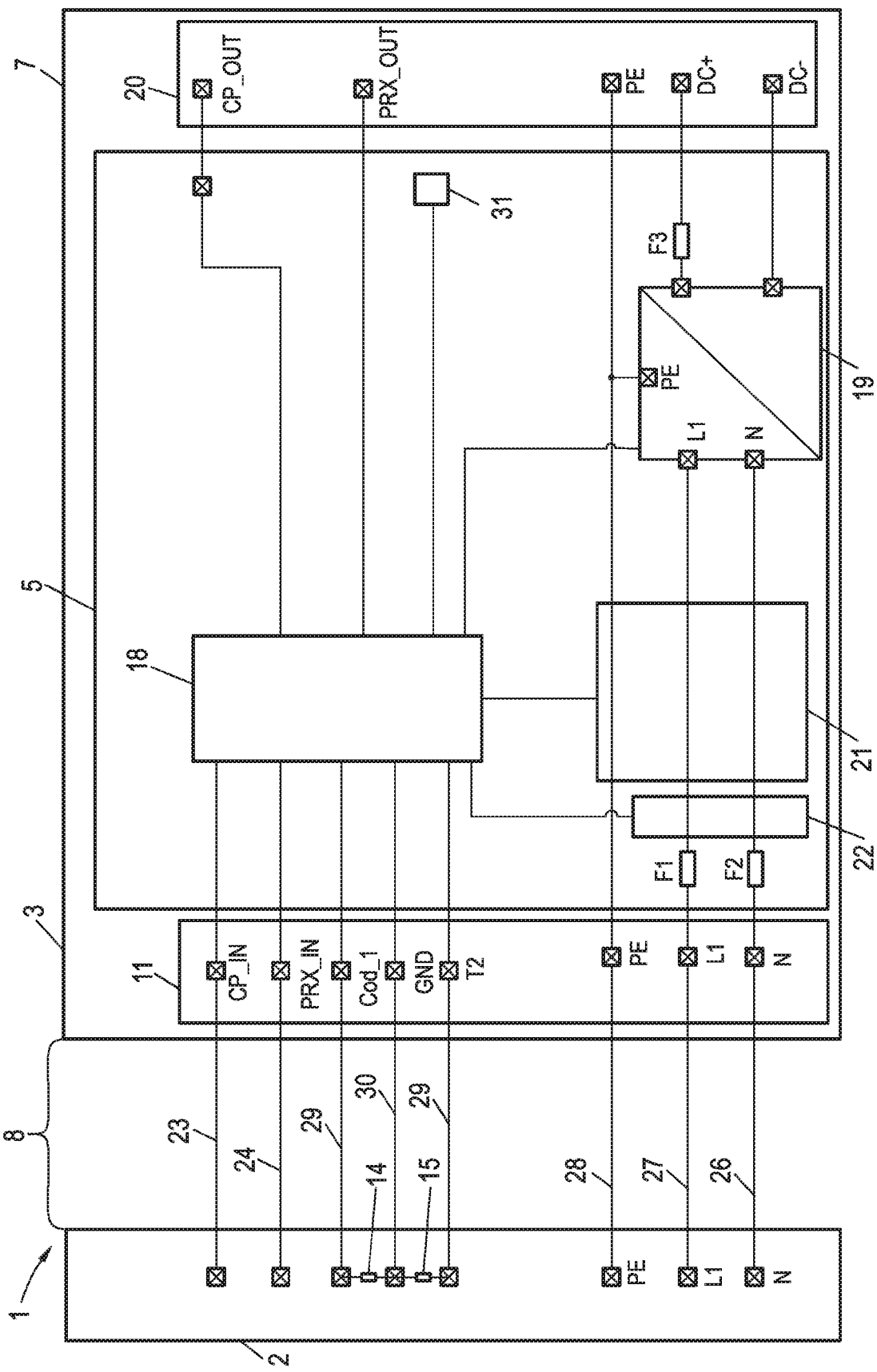

CHARGING CABLE

FIELD

The invention relates to a charging cable comprising a rectifier and also a first connector element and a second connector element, wherein the first connector element is designed for connection to a vehicle-external power source and the second connector element is designed for connection to a charging socket of a motor vehicle comprising an electrical traction energy accumulator, wherein an alternating current supplied at the first connector element is convertible by the rectifier into a direct current deliverable at the second connector element.

BACKGROUND

Motor vehicles which comprise an electrical traction battery are also referred to as electric vehicles. Such electric vehicles are generally charged via the general power network and/or the low-voltage network. For this purpose, an alternating current supplied by the power network or an AC voltage supplied by the power network has to be converted into a direct current or a DC voltage, respectively, to be able to charge the traction battery of the electric vehicle. This conversion can be performed, for example, by a charging device, which comprises a rectification unit. Direct current charging (DC charging) and alternating current charging (AC charging) are available as charging options of the electric vehicle. Electric vehicles suitable for DC charging generally have a DC connector, via which they can be connected to a vehicle-external DC charging station. A rectifier which rectifies the alternating current used in the power network is installed in this case in the vehicle-external charging station.

In AC charging, an AC connector of the motor vehicle is connected to an AC charging station or an AC current source. A rectification of the alternating current or the AC voltage, respectively, takes place in this case via a rectifier installed in the vehicle, which is generally part of a charging device installed in the motor vehicle. Such charging devices installed in the motor vehicle typically have charging powers between 3.6 kW and 44 kW. Powers up to 350 kW can be achieved with external charging devices, as are installed in DC charging columns.

In AC charging, inter alia, a differentiation is made between so-called mode 2 charging and so-called mode 3 charging (international norm IEC 61851). In mode 2 charging, in which the motor vehicle is charged at a one-phase or multiphase alternating current source, a cable having an integrated control and protective circuit embodied, for example, as an in-cable control box (ICCB) can be used (international norm IEC 62752). In mode 3 charging, a wall box and/or a standing column is used as an alternating current source. A connection of the respective alternating current source to the motor vehicle takes place via a cable, using which the alternating current source is connected to the charging device installed in the motor vehicle. The charging device in the vehicle is connected to the AC connector or a charging socket comprising an AC connector, respectively, of the motor vehicle and to the high-voltage DC voltage network of the motor vehicle. Since such charging devices have a substantial structural size in particular at high charging powers and require cooling, for example, via a connection to the cooling system of the motor vehicle, because of the converted electrical powers, it is desirable to dispense with such motor-vehicle-side charging devices, in particular since they are not required for DC charging.

Since, with increasing availability of private and public DC charging columns, because of the higher charging powers enabled thereby, the charging via AC charging options and thus the frequency of use of the charging device integrated into the vehicle decreases, it is desirable to provide charging options for alternating current sources which can dispense with a rectifier integrated into the vehicle. Various options are known for this purpose from the prior art.

Thus, DE 10 2015 207 400 A1 describes a cable winding device in addition to transformers for charging and/or discharging accumulators of electric vehicles. The device comprises a stationary and a rotatable part, wherein the rotatable part is provided for winding up a charging cable having a charging plug and the stationary part comprises a connector for connection to a power network. In this case, the rotatable part and the stationary part are electrically connected to one another via an electrical transformer. Furthermore, a power electronics unit is integrated into the winding device, which converts an AC voltage received from a three-phase AC voltage network into a DC voltage for charging accumulators and vehicle batteries.

An energy transmission device having an energy receiving connector and an energy delivery connector is described in DE 10 2016 106 840 A1. The device can be coupled via the energy receiving connector to a donor electric vehicle or an electric vehicle charging station. The device can be connected to an electric vehicle to be charged via the energy delivery connector. The energy transmission device can be equipped with a power converter, which is designed for the electrical conversion of the energy received at the energy receiving connector before the provision at the energy delivery connector. Since the charging cables used for charging the motor vehicle are typically carried along in the motor vehicle, it is desirable if they are as small as possible and as light as possible.

SUMMARY

The invention is therefore based on the object of specifying a charging cable usable in the most versatile possible manner, which in particular enables charging without a charging device installed in the vehicle.

To achieve this object, it is provided according to the invention that the first connector element is detachably fastened on the charging cable via an interface of the charging cable. This advantageously enables various types of first connector elements to be able to be kept ready, wherein the respective first connector element to be used for an available energy source can be connected via the interface to the charging cable. This has the advantage that the charging cable and in particular the rectifier installed in the charging cable can be used for various types of charging scenarios. In particular, this thus enables the charging cable to be connected via a corresponding first connector elements to one-phase, two-phase, or three-phase vehicle-external alternating current sources.

The rectifier of the charging cable can comprise a control unit, via which the operation of the rectifier is controllable. A rectifier and/or a charging device in the motor vehicle can be omitted because of the rectifier provided in the charging cable. This has the advantage that the vehicle weight can be reduced due to the omission of a motor vehicle-side charging device. Furthermore, the charging cable according to the invention represents an accessory component and not an integrated component of the motor vehicle, which facilitates, for example, adapting the charging cable to various regionally available energy sources and/or various regionally applicable regulations.

The second connector element is used for connecting the charging cable to a charging socket, in particular a direct current charging socket, of a motor vehicle comprising an electrical traction energy accumulator. The second connector element can be embodied for this purpose, for example, as a CCS plug or as a CHAdeMO plug.

It can be provided according to the invention that the first connector element comprises at least one resistor as a resistance code, wherein the rectifier is operable in dependence on the resistance value of the at least one resistor. For this purpose, for example, a control unit controlling the operation of the rectifier can be connected via one or more analysis lines to the connector element, so that the resistor provided as a resistance code in the first connector element can be read out. The first connector element can be designed as a plug connectable to an alternating current network. Such a plug can differ in dependence on the type of the alternating current network. In the case of a one-phase AC voltage network, for example, a Schuko-type plug can be used as the first connector element. In the case of two-phase or three-phase systems, for example, the use of a CEE plug is conceivable. By providing the at least one resistor as a resistance code in the first connector element, the type of the first connector element and/or the type of the alternating current network can be detected, so that the rectifier can be operated in accordance with the alternating current network, in particular in dependence on the number of the phases of the alternating current network.

It can be provided according to the invention that the interface is embodied as a coupling. The coupling can comprise two coupling sections which can be coupled, for example, a plug or a socket, by way of which a detachable fastening of the first connector element on the charging cable is possible. In this case, one coupling section can be connected to the first connector element and the second coupling section can be connected to the second connector element and/or a cable section of the charging cable. The coupling can comprise a fastening device, for example, a bayonet fitting or plugs or sockets, respectively, which can lock one inside another or be inserted one inside another. It is possible in this case that a cable section of the charging cable is arranged in each case between the interface and the first connector element and between the interface and the second connector element, respectively, so that the interface is connected to the first connector element and the second connector element via a cable section in each case.

It can also be provided according to the invention that the interface is arranged on the first connector element. This enables various connector elements to be able to be detachably fastened directly on the interface, so that in addition to the charging cable, only various types of first connector elements have to be carried along for charging at various vehicle-external energy sources. The second connector element and/or one or more cable sections of the charging cable can be used independently in this case of the selected first connector element. The interface can be embodied in this case as a coupling, wherein a coupling section of the coupling can be integrated into the first connector element.

Alternatively, it can be provided according to the invention that the interface is arranged on a receptacle section of the charging cable, which accommodates a protective circuit, is integrated into the charging cable, and is permanently connected to the second connector element. The receptacle section of the charging cable can be, for example, a so-called in-cable control box (ICCB). The protective circuit accommodated in the receptacle section can comprise, for example, a means for electrical disconnection and/or at least one electrical safety circuit, for example, a current limiting circuit and/or a FI switch or a fuse. It is possible that the rectifier of the charging cable is also arranged in the receptacle section. The receptacle section of the charging cable can be permanently connected to the second connector element in particular via a cable section of the charging cable. The first connector element can be detachably or permanently connected to a first end of a further cable section, wherein the second end of the further cable section is connected to the interface arranged on the receptacle section. It is possible that the receptacle section is enclosed by a housing to protect the components of the charging cable arranged therein.

Alternatively, it can be provided according to the invention that the interface is arranged on the second connector element. A connection of the interface to the first connector element or a possibly provided receptacle section of the charging cable can take place in this case via a cable section of the charging cable.

In one preferred design of the invention, it can be provided that the rectifier is arranged in a housing of the second connector element. This enables a space-saving embodiment of the charging cable. In the case of a rectifier arranged in the housing of the second connector element, in the case of an interface arranged on the second connector element, a first connector element permanently connected to a cable section of the charging cable can be detachably connected in each case to the second connector element and/or to the rectifier arranged in the housing of the second connector element. It is also possible that the second connector element is permanently connected to a first end of a cable section, wherein the interface is arranged at the second end of the cable section and is detachably connected to the first connector element.

It can be provided according to the invention that at least one means for electrical disconnection and/or at least one electrical safety circuit are arranged in the housing of the second connector element. The safety circuit accommodated in the receptacle section can comprise, for example, a power limiting circuit and/or a FI switch or a fuse. The arrangement of the means for electrical disconnection and/or the protective circuit in the housing of the second connector element enables the functionality provided by the in-cable control box, for example, also to be integrated into the housing of the second connector element. An in-cable control box and/or a receptacle section of the charging cable can thus advantageously be omitted.

It can be provided according to the invention for the rectifier that it comprises semiconductor elements made of silicon carbide and/or gallium nitride. The use of semiconductor components made of silicon carbide and/or gallium nitride enables rectifiers which are suitable for converting comparatively high powers to be embodied in a small format and light, whereby in particular an integration of the rectifier into a housing of the second connector element is simplified.

It can be provided according to the invention that at least one temperature sensor is arranged in each case on the first connector element and/or on the second connector element, wherein the rectifier is operable in dependence on at least one temperature measured by the temperature sensors. It can be provided in particular that if a temperature measured by one of the temperature sensors exceeds a temperature limiting value, a power converted by the rectifier is reduced and/or the operation of the rectifier is stopped. In this manner, overheating of the charging cable and/or wear of the first connector element and/or the second connector element can be prevented. The temperature sensors can be connected for this purpose, for example, to a control unit of the rectifier, wherein the control unit analyzes the temperature measured values generated by the temperature sensors and operates the operation of the rectifier in dependence on the temperature measured by at least one of the temperature sensors.

Additionally or alternatively thereto, it can be provided according to the invention that the charging cable comprises at least one signal line, via which at least one item of charging information is transmittable between a charging unit attached to the first connector element and the rectifier, wherein the rectifier is operable in dependence on the charging information. This enables, for example, a maximum electrical current deliverable by the charging unit attached to the first connector element to be taken into consideration in the operation of the rectifier.

It can be provided according to the invention that the rectifier comprises at least one current measuring means for at least one current flowing through the charging cable and/or at least one voltage measuring means for measuring at least one voltage value of the alternating current and/or the direct current. The measured values generated by the current measuring means or the voltage measuring means can be analyzed, for example, by a control unit of the rectifier, wherein an activation of the rectifier can be carried out in dependence on the measured values. Furthermore, it is possible that upon exceeding a voltage measured value and/or a current measured value, a shutdown of the rectifier and/or a triggering of a protective circuit of the charging cable, for example, a FI switch, is performed.

BRIEF DESCRIPTION OF THE DRAWINGS

Further advantages and details of the invention result from the exemplary embodiments described hereafter and on the basis of the drawings. In the figures:

FIG. 3 shows a schematic circuit diagram of a third exemplary embodiment of a charging cable according to the invention.

DETAILED DESCRIPTION

Figure 1:
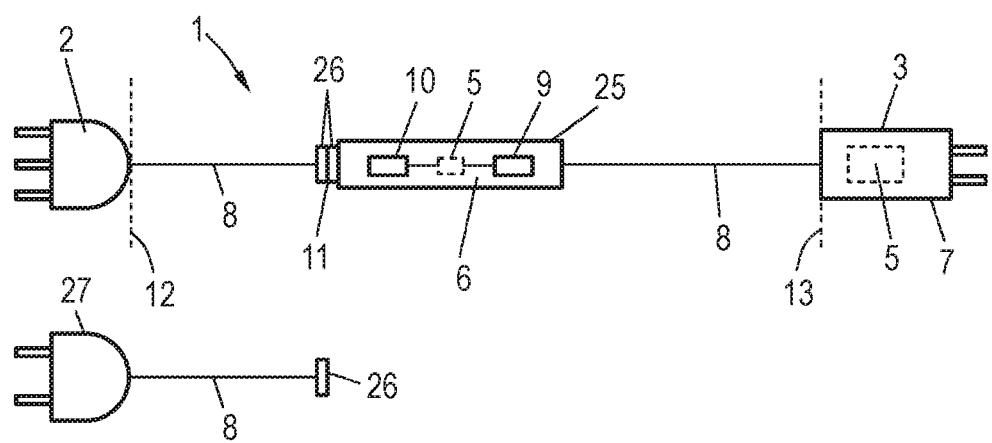
FIG. 1 shows a schematic illustration of a first exemplary embodiment of a charging cable according to the invention.

A first exemplary embodiment of a charging cable 1 is illustrated in FIG. 1. The charging cable 1 comprises a first connector element 2, which is designed for connection to a vehicle-external energy source. The vehicle-external energy source can be a charging column, a wall box, or an outlet of an alternating current network. The charging cable 1 furthermore comprises a second connector element 3, which is designed for connection to a charging socket of a motor vehicle comprising an electrical traction energy accumulator. The second connector element 3 is embodied in this case in such a way that it is connectable to a charging socket of the motor vehicle designed for direct current charging, for example, or to a section of a charging socket of the motor vehicle designed for direct current charging, respectively. The second connector element can be embodied, for example, as a CHAdeMO plug or as a CCS plug.

Furthermore, the charging cable 1 comprises a rectifier 5, which is arranged either in a receptacle section 6 of the charging cable 1 comprising a housing 25 or in the interior of a housing 7 of the second connector element 3. The rectifier 5 is used to rectify an alternating current or an AC voltage, respectively, supplied via the first connector element 2 into the charging cable 1, so that a traction energy accumulator of a motor vehicle attached to the second connector element 3 can be charged via the generated direct current or via the generated DC voltage, respectively.

The receptacle section 6 is connected to the first connector element 2 and the second connector element 3 in each case via a cable section 8. The cable sections each comprise multiple conductors or leads, which are enclosed by a common, insulating cladding. The number of the leads can conform in this case to the embodiment of the first connector element 2 and/or as to whether direct current or one-phase or multiphase alternating current is transmitted via the respective cable section 8. The receptacle section 6 furthermore comprises a means 9, embodied, for example, as a transformer or as a DC voltage converter, for electrical disconnection, and also a safety circuit 10, which can interrupt the electrical connection between the first connector element 2 and the second connector element 3, for example, upon the occurrence of an excessively high current in the charging cable 1. For example, a current limiting circuit and/or a FI switch or a fuse can be used as a safety circuit.

Furthermore, the charging cable 1 comprises an interface 11 designed as a coupling comprising two coupling sections 26, via which the first connector element 2 is detachably fastened on the charging cable 1. The interface can be arranged on the receptacle section 6, as shown in FIG. 1. In this case, one coupling section 26 is arranged on the receptacle section and one coupling section 26 is arranged on the cable section 8 connected to the first connector element 2. Alternatively thereto, the interface 11 can also be arranged at the position identified by the line 12 on the first connector element 2. In this case, one coupling section 26 is arranged on the first connector element 2 and one coupling section 26 is arranged on the cable section 8. It is furthermore possible that the interface 11 is alternatively arranged at the position identified by the line 13 on the second connector element 3, wherein one coupling section 26 is arranged on the second connector element 3 and one coupling section 26 is arranged on the cable section 8.

Connector elements 2 embodied in various fashions can be detachably connected to the charging cable 1 via the interface 11. This enables a connection of the charging cable 1 to various types of alternating current sources and/or alternating current networks. A connection to a two-phase or three-phase alternating current source can take place, for example, via a first connector element 2 embodied as a CEE plug. Alternatively, a connection to a one-phase alternating current source can be performed, for example, using a further first connector element 27 embodied as a grounded pin plug. The further first connector element 27 is connected for this purpose via a cable section 8 to a coupling section 26 and can be connected instead of the first connector element 2 via the interface 11 to the charging cable 1, so that the charging cable 1 can be used for charging via a one-phase alternating current source connectable to the further connector element 27.

Figure 2:
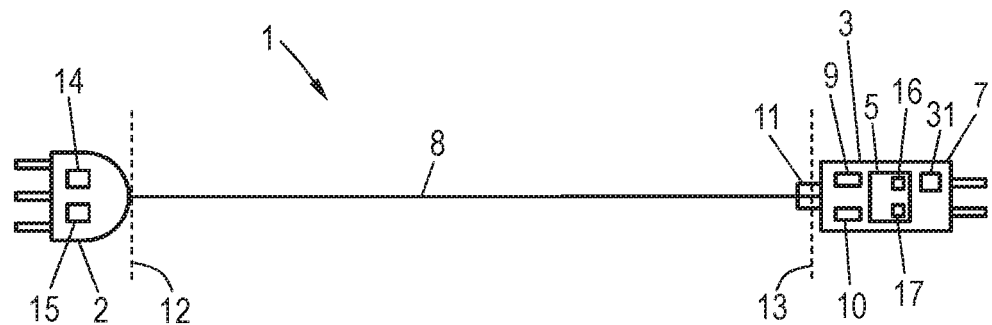
FIG. 2 shows a schematic illustration of a second exemplary embodiment of a charging cable according to the invention.

A second exemplary embodiment of a charging cable 1 is illustrated in FIG. 2. In this exemplary embodiment, the rectifier 5 is arranged in the interior of the housing 7 of the second connector element 3. Furthermore, the means for electrical disconnection 9 and the electrical safety circuit 10 are arranged in the housing 7 of the second connector element 3. The interface 11 is arranged at the position marked by the line 13 on the second connector element. Alternatively, in this exemplary embodiment an arrangement of the interface 11 at the position marked by the line 12 on the first connector element 2 is possible.

Due to the detachable connection of the first connector element 2 or of the first connector element 2 and the cable section 8, respectively, it is made possible for various first connector elements 2 to be connected to the second connector element 3 or to the cable section 8 and the second connector element 3, respectively. This enables a matching first connector element to be selected in dependence on an available charging option and detachably fastened on the charging cable via the interface 11.

The first connector element 2 furthermore comprises a resistor 14 as a resistance code. The resistance value of the resistor 14 can be read out, for example, by a control unit of the rectifier 5 via at least one signal line of the cable section 8, wherein the rectifier 5 can be operated in dependence on this resistance value. This enables, for example, upon the use of a first connector element 2, which is designed for connection to a one-phase alternating current network, the rectifier to be operated in accordance with a one-phase rectification. The first connector element 2 can be embodied in this case, for example, as a grounded pin plug, wherein this embodiment is associated with a specific resistance value of the resistor 14. Accordingly, further embodiments of the connector element 2 can also be coded via other resistance values of the resistor 14, which enable, for example, a connection to two-phase or three-phase alternating current networks. Accordingly, in these cases the rectifier 5 can be operated for rectification of a two-phase or three-phase alternating current, respectively.

Furthermore, a temperature sensor 15 is arranged in the first connector element 2 and a temperature sensor 31 is arranged in the second connector element 3, wherein the rectifier is operable in dependence on at least one temperature measured by one of the temperature sensors 15, 31. For example, it is possible that if a temperature value measured by one of the temperature sensors 15, 31 exceeds a temperature measured value, a current flowing through the charging cable 1 is reduced and/or switched off by activation of the rectifier 5, so that damage or wear to the charging cable 1, in particular the first connector element 2 and/or the second connector element 3, can be avoided. The rectifier 5 comprises a current measuring means 16 and a voltage measuring means 17, which are used for measuring a current flowing through the charging cable 1 or for measuring at least one voltage value of the alternating current and/or the direct current, respectively. Upon the occurrence of an excessively high voltage or an excessively high current, an adaptation of the operation of the rectifier 5 can take place and/or switching off of the rectifier 5 can be performed.

A schematic circuit diagram of a third exemplary embodiment of a charging cable 1 is illustrated in FIG. 3, which is used for connection to a one-phase alternating current source. The rectifier 5 integrated into the housing 7 of the second connector element 3 comprises a control unit 18, which is embodied as a microcontroller and is connected to a rectifier unit 19. The rectifier unit 19 is used for rectifying a one-phase AC voltage, which is transmitted from the first connector element 2 via the cable section 8 to the second connector element 3. For this purpose, the cable section 8 comprises a first line 26 for the neutral conductor (N), a second line 27 for the phase of the alternating current (L1), and a third line 28 for the ground conductor (PE). In the case of a charging cable 1 designed for connection to a two-phase or three-phase alternating current source, it is possible that in addition a further conductor is provided in each case for a second phase and a third phase of a three-phase alternating current.

The alternating current transmitted from the first connector element 2 to the rectifier 5 is converted by the rectifier unit 19 of the rectifier 5 into a direct current. The rectifier unit 19 is connected with its DC voltage side to two contacts 20 (DC+ and DC−) of the second connector element 3 provided for the connection of the charging cable 1 to the charging socket of a motor vehicle. To achieve the smallest possible size of the rectifier 5, the rectifier unit 19 comprises semiconductor components made of silicon carbide and/or gallium nitride.

The rectifier 5 furthermore comprises a circuit 21 for fault current measurement and a circuit 22, which is used for the power supply of the control unit 18. The resistor 14 provided in the first connector element 2 for the resistance code of the type of the first connector element 2 and the temperature sensor 15 provided in the first connector element 2 are also each connected via a signal line 29 of the cable section 18 via the interface 11 to the control unit 18. Furthermore, a ground line 30 (GND) and two further signal lines 23, 24 (CP_in and PRX) are provided. The signal line 23 can be used for communication between the control unit 18 and a charging station connected to the first connector element 2. For example, for this purpose items of charging information can be transmitted between the control unit 18 and the charging station, as are provided in international standards. The signal line 24 can be used, for example, via a resistance code, to obtain items of information with respect to a maximum permissible current strength for the first connector element 2 or the cable section 8. For transmitting corresponding items of information, the control unit 18 is connected to contacts (CP_out, PRX_out) of the contacts 20 provided for the signal transmission.

A temperature of the second connector element 3 can be measured by the control unit 18 via a temperature sensor 31. In the event of an excessively high measured temperature of the second connector element 3 or an excessively high temperature of the first connector element 2 measured via the temperature sensor 15, a reduction and/or shutdown of a current transmitted via the charging cable 1 can be carried out by activating the rectifier unit 19. To avoid excessively high current strengths, the rectifier 5 furthermore comprises three fuses F1, F2, and F3.

In dependence on the type of the first connector element 2 determinable via the resistance value of the resistor 14, the rectifier 5 can be operated by the control unit 18 by an activation of the rectifier unit 19. A possibly provided second phase and/or a possibly provided third phase of an alternating current source can be connected via additional contacts (not shown) of the interface 11 to the alternating current side of the rectifier unit 19 in each case, so that upon connection of the first connector element 2 to a charging station, which provides a two-phase or a three-phase alternating current, a rectification of all phases of the alternating current can take place.

The invention claimed is:

1. A charging cable, comprising:
   a rectifier, a first connector element, and a second connector element, wherein the first connector element is designed for connection to a vehicle-external energy source and the second connector element is designed for connection to a charging socket of a motor vehicle with an electrical traction energy accumulator, wherein an alternating current supplied at the first connector element is convertible by the rectifier into a direct current deliverable at the second connector element, wherein the first connector element is connectable, at a first end of the first connector element, to the vehicle-external energy source and wherein the first connector element is detachably fastened, at a second end of the first connector element, on the charging cable via an interface of the charging cable.

2. The charging cable according to claim 1, wherein the first connector element has at least one resistor as a resistance code, wherein the rectifier is operable in dependence on the resistance value of the at least one resistor.

3. The charging cable according to claim 1, wherein the interface is a coupling.

4. The charging cable according to claim 1, wherein the interface is arranged on the first connector element.

5. The charging cable according to claim 1, wherein the interface is arranged on a receptacle section of the charging cable, which accommodates a protective circuit, is integrated into the charging cable, and is permanently connected to the second connector element.

6. The charging cable according to claim 1, wherein the interface is arranged on the second connector element.

7. The charging cable according to claim 1, wherein the rectifier is arranged in a housing of the second connector element.

8. The charging cable according to claim 7, wherein at least one means for electrical disconnection and/or at least one electrical safety circuit are arranged in the housing of the second connector element.

9. The charging cable according to claim 1, wherein the rectifier includes semiconductor components made of silicon carbide and/or gallium nitride.

10. The charging cable according to claim 1, wherein at least one temperature sensor is arranged in each case on the first connector element and/or the second connector element, wherein the rectifier is operable in dependence on at least one temperature measured by the temperature sensors.

11. The charging cable according to claim 1, wherein the charging cable includes at least one signal line, via which at least one item of charging information is transmittable between a charging unit attached to the first connector element and the rectifier, wherein the rectifier is operable in dependence on the charging information.

12. The charging cable according to claim 1, wherein the rectifier includes at least one current measuring means for measuring at least one current flowing through the charging cable and/or at least one voltage measuring means for measuring at least one voltage value of the alternating current and/or the direct current.

* * * * *